（12) United States Patent
Young et al.

(10) Patent No.: US 7,210,703 B2
(45) Date of Patent: May 1, 2007

(54) ONE-PIECE INITIATOR DEVICE FOR INFLATORS

(75) Inventors: Anthony M. Young, Malad, ID (US); Bryce L. Robinette, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 396 days.

(21) Appl. No.: 10/973,219

(22) Filed: Oct. 26, 2004

(65) Prior Publication Data

US 2006/0087106 A1 Apr. 27, 2006

(51) Int. Cl.
*B60R 21/26* (2006.01)
(52) U.S. Cl. ............... 280/741; 280/737; 102/202.9; 102/202.14; 102/530; 102/531
(58) Field of Classification Search .......... 280/737, 280/741; 102/202.9, 202.14, 202.8, 202.11, 102/275.11, 530, 531; 60/232, 233, 235
See application file for complete search history.

(56) References Cited

U.S. PATENT DOCUMENTS 5,664,803 A * 9/1997 Skangnberg et al. ........ 280/737
6,073,963 A * 6/2000 Hamilton et al. ........... 280/741
6,161,481 A * 12/2000 Shirk et al. ................. 102/530
6,295,935 B1* 10/2001 Swann et al. ............... 102/530
6,709,011 B2* 3/2004 Neunzert et al. ........... 280/736
7,125,041 B2* 10/2006 Kato et al. .................. 280/736

* cited by examiner

*Primary Examiner*—Paul N. Dickson
*Assistant Examiner*—Joseph Rocca
(74) *Attorney, Agent, or Firm*—Sally J Brown; Pauley Petersen & Erickson

(57) ABSTRACT

A one-piece initiator device including an end closure having a first end portion and a second end portion opposite the first end portion. The end closure forming a passage between the first end portion and the second end portion. A squib is at least partially positioned within the passage. A canister is mounted to the squib and extends outwardly from the end closure first end portion. The canister defines a charge chamber having a reactive charge disposed within the charge chamber. A permeable fill material is disposed within the passage and joins the squib to the end closure to form the one-piece initiator device. The permeable fill material insulates the squib from electrical contact with the end closure and provides a controlled gas flow path through the one-piece initiator device.

15 Claims, 2 Drawing Sheets

ONE-PIECE INITIATOR DEVICE FOR INFLATORS

BACKGROUND OF THE INVENTION

This invention relates generally to one-piece initiator devices for use in inflators of vehicular inflatable restraint systems, and, more particularly, to one-piece initiator devices including a permeable fill material providing a controlled gas flow path through the initiator device.

It is well known to protect a vehicle occupant using a cushion or bag, e.g., an "airbag cushion," that is inflated or expanded with gas such as when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

Many various inflators have been disclosed in the art for the inflating of one or more inflatable restraint system airbag cushions. One category of such inflators is often referred to as "compressed gas inflators" and refers to various inflators which contain a selected quantity of compressed gas. For example, one particular category of compressed gas inflator, commonly referred to as a "stored gas inflator," simply contains a quantity of a stored compressed gas which is selectively released to inflate an associated airbag cushion. A second category of compressed gas inflator, commonly referred to as "hybrid inflators," typically supplies or provides inflation gas as a result of a combination of stored compressed gas with combustion products resulting from the combustion of a gas generating material.

Compressed gas inflators typically require undesirably complicated and/or considerably multiple component assemblies which can undesirably increase manufacturing steps and costs. Further, many prior art inflators include a squib or initiator device connected to a gas storage chamber at an opening formed in a base portion of the gas storage chamber to form an enclosure mounted initiator device. One goal of these prior art inflator devices has been to provide a completely hermetic seal or bond between the initiator device and the gas storage chamber base portion. Thus, these prior art inflator devices typically use an impermeable and non-shrinkable material to connect the two components. However, such prior art inflator devices may in some cases develop a gas leak over time, which, because of the hermetically sealed components, is not readily detectable during preassembly testing of the inflator device. Typically, the leaked gas accumulates in a space between the initiator device and a cap positioned at the base portion of the gas storage chamber. As a result of the delayed gas leakage, the inflator device may become non-functional or defective. If installed in an inflatable vehicle restraint system, such an inflator device, upon deployment, may not provide adequate or sufficient inflation gas for the proper inflation of an associated airbag cushion.

There is a need for a more simplified inflator that can be more easily and inexpensively produced. Further, there is a need for an inflator that can be reliably tested before being installed into a vehicle restraint assembly. There is also a need for a more simplified inflator which can be used in various airbag installations and in various vehicular types.

There is also a need for an initiator device that facilitates gas leak detection and has a simplified construction for easier assembly with a corresponding inflator.

SUMMARY OF THE INVENTION

A general object of the invention is to provide an improved inflator device.

It is also a general object of the invention to provide a one-piece initiator device having a simplified construction for easier assembly with a corresponding inflator that facilitates gas leak detection.

A more specific objective of the invention is to overcome one or more of the problems described above.

The above and other objects of the invention can be attained through a one-piece initiator device that includes an end closure having a first end portion and a second end portion opposite the first end portion. The end closure forms a passage between the first end portion and the second end portion. A squib is at least partially positioned within the passage. A canister is mounted to the squib and extends outwardly from the end closure first end portion. The canister defines a charge chamber wherein a reactive charge is disposed. A permeable fill material is disposed within the passage to join the squib to the end closure to form the one-piece initiator device. The permeable fill material insulates the squib from electrical contact with the end closure and provides a controlled gas flow path through the initiator device.

The prior art generally fails to provide an initiator device including a permeable fill material that secures a squib within an end closure passage and provides a controlled gas flow path through the initiator device, wherein a location and/or an amount of gas leakage through the initiator device can be detected, monitored and/or measured.

The invention further comprehends a one-piece initiator device including an end closure having a first end portion and a second end portion opposite the first end portion. The end closure forms a passage between the first end portion and the second end portion. A squib is at least partially positioned within the end closure passage and is joined to the end closure. A canister is mounted to the squib and extends outwardly from within the end closure passage. The canister defines a charge chamber. A reactive charge is disposed within the charge chamber. A conductive pin is positioned within an eyelet formed by the squib, and is in actuating communication with the reactive charge. A permeable fill material surrounds at least a portion of the squib and joins the squib to an inner wall of the end closure to form the one-piece initiator device. The permeable fill material insulates the squib from electrical contact with the end closure and provides a controlled gas flow path through the initiator device.

The invention still further comprehends an inflator including a one-piece initiator device. The one-piece initiator device includes an end closure having a first end portion and a second end portion opposite the first end portion. The end closure forms a passage between the first end portion and the second end portion. A squib is at least partially positioned within the passage. A canister extends outwardly from the end closure first end portion and defines a charge chamber. A reactive charge is disposed within the charge chamber. A conductive pin is positioned within an eyelet formed by the squib, and in actuating communication with the reactive charge. A permeable fill material is disposed within the end closure passage and between an inner wall of the end closure and at least a portion of the squib. The permeable fill material joins the squib to the end closure to form the one-piece initiator device. The permeable fill material also insulates the squib from electrical contact with the end closure and provides a controlled gas flow path through the initiator device.

The inflator also includes a cap that is joined to the end closure first end portion to cover the canister. A gas storage vessel is attached to the end closure, and in combination with the cap forms a gas storage chamber containing a supply of an inflation gas. The cap normally prevents contact between the supply of the inflation gas and the permeable fill material.

As used herein, references to "a controlled gas flow path" are to be understood to refer to a gas flow path formed or provided by the permeable fill material, which allows gas flow, for example along a direct path or a tortuous path, through the initiator device in a controlled manner, such that a location and/or an amount of gas leakage can be detected, monitored and/or measured.

Other objects and advantages of the invention are apparent to those skilled in the art, in view of the following detailed description taken in conjunction with the appended claims and drawings.

DETAILED DESCRIPTION OF THE INVENTION

The present invention provides an initiator device, more particularly a one-piece, e.g., integrally molded initiator device for mounting within an opening at an end portion of a gas storage chamber to form an inflator. As described in greater detail below, the one-piece initiator device of the invention provides a cost savings over production and assembly of prior art initiator devices as it yields desired initiator performance with a one-piece initiator device which is more easily assembled into an inflator, thereby reducing production steps and material costs as compared to typical prior art initiation assemblies. Further, the initiator device of the invention provides a controlled gas flow path through the initiator device to facilitate gas leak detection, such as during testing and inspection of an inflator in which such an initiator device has been mounted, for example.

Figure 1:
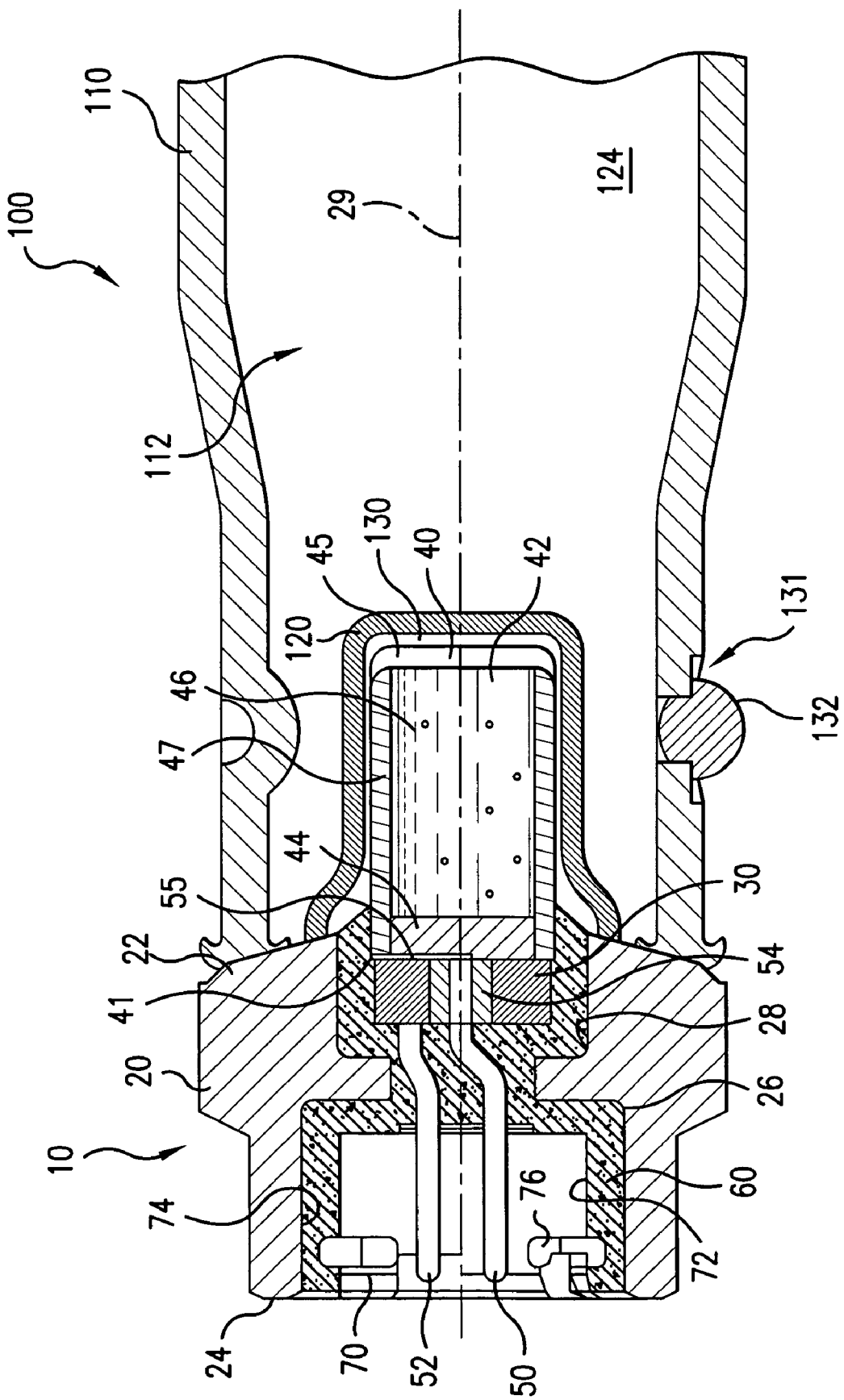
FIG. 1 shows a partial sectional view of an inflator including a one-piece initiator device mounted with respect to an opening formed in an end portion of a gas storage vessel in accordance with one preferred embodiment of the invention.

Referring to FIG. 1, the one-piece initiator device 10 according to one preferred embodiment of this invention includes an end closure 20 having a first end portion 22 and a second end portion 24 opposite the first end portion 22. The end closure 20 forms a passage 26 defined by an inner wall 28 of the end closure 20, that extends through the end closure 20 between the first end portion 22 and the second end portion 24. As will be appreciated by those skilled in the art and guided by the teachings herein provided, the end closure 20 can have any suitable size, shape and materials of construction, such as metal, depending upon the desired configuration of the inflation restraint system in which the one-piece initiator device 10 is used. As shown in FIG. 1, the end closure 20 preferably has a generally cylindrical shape and is generally positioned about a longitudinal axis 29 of the one-piece initiator device 10. As will also be appreciated by those skilled in the art and guided by the teachings herein provided, the passage 26 can have any suitable size and/or shape that preferably facilitates the unification of the initiator squib with the end closure, as discussed in greater detail below.

A squib 30 is at least partially positioned within the passage 26 and joined to the end closure 20. Preferably, the squib 30 is secured within the passage 26 and coaxially positioned with the end closure 20 along the one-piece initiator device longitudinal axis 29. The squib 30 is generally designed to provide or produce an ignition charge upon receipt of an electrical signal, as discussed in greater detail below.

As shown in FIG. 1, a canister 40 is mounted or connected to the squib 30 at an open end portion 41 of the canister 40. The canister 40 extends outwardly from the end closure first end portion 22, preferably along longitudinal axis 29. The canister 40 forms or defines a charge chamber 42. The charge chamber 42 includes or contains at least one actuatable charge material, such as a reactive charge disposed or contained within the charge chamber 42. In practice, the actuation of the reactive charge will generally desirably serve to rupture the canister 40. Thus, the canister 40 is preferably made of materials known in the art, such as metal, and formed such that it can be ruptured, such as by discharged reaction products of the actuated reactive charge. The canister 40 can be ruptured by the reactive charge directly, for example, by the exothermic reaction of the reactive charge within the charge chamber 42. In one preferred embodiment of the invention, the reactive charge is a pyrotechnic material, which upon actuation, reacts to produce reaction products including at least heat, and desirably may also form gas as well. The reaction charge creates a discharge of reaction products which is directed within the charge chamber 42 toward a rupturable closed end portion 45 of the canister 40. The initiator canister 30 preferably includes a charge holder 47 which is used to direct and/or focus the discharged reaction products from the actuated reactive charge toward the closed end opening 45.

Alternatively, the canister 40 can be ruptured by the reactive charge indirectly, for example, by a projectile propelled through the canister 40 by a force emanating from the reacting reactive charge. In such an embodiment, the reactive charge is preferably disposed at a proper end portion of the projectile. Such inflators typically have a rupture disk in close proximity to the squib, and are of a form commonly referred to as "reverse flow" inflators wherein the inflation gas exits the end of the inflator at which the squib is disposed. As will be appreciated by those skilled in the art and guided by the teachings herein provided, the reactive charge may include any suitable material capable of reacting to produce a product gas upon ignition activation of the squib 30.

Typically, known inflator initiators include at least one electrical terminal, often a conductive pin, for electrical contact with an associated electrical connector and such as designed to properly receive an electrical signal therefrom. The one-piece initiator device 10 of this invention includes at least one electrical terminal, more particularly at least one conductive pin. In the one-piece initiator device 10 of FIG. 1, a pair of electrical terminals, shown as electrical conductive pins 50 and 52, respectively, are connected to the squib 30 and in actuating communication with the reactive charge. The electrical conductive pins 50 and 52 are in "actuating communication" with the reactive charge such that the conductive pins 50 and 52 are able to initiate reaction of the reactive charge upon receiving an electrical signal from an associated electrical connector. As shown in FIG. 1, the first conductive pin 50 is attached to the squib 30 with one end positioned within an eyelet 54 and an opposite end toward the end closure second end 24. An insulating material (not shown) within the eyelet 54 can be used to separate and insulate the first conductive pin 50 from the squib 30. The second conductive pin 52, separated from the first conductive pin 50, is attached to the squib 30. As known in the art, a bridgewire 55 can be used to connect the conductive pin 50 to the squib 30 when the insulating material is present, thereby closing a circuit between the conductive pin 50 and the conductive pin 52. As will be appreciated by those skilled in the art and guided by the teachings herein provided, various electrical terminal configurations known in the art can be used with the one-piece initiator device of this invention.

The reactive charge can include one or more known reactive charge materials which can be actuated by an electrical current introduced through the conductive pins 50 and 52 described below. The reactive charge can include a fuel slurry and an oxidizer slurry mixed together and positioned in the charge chamber 42. Examples of reactive charges known in the art and useful in the one-piece initiator device 10 include mixtures including zirconium and potassium perchlorate (ZPP). In one embodiment of this invention, the reactive charge is a powder and at least a portion of the powder reactive charge is packed around the bridgewire 55 to maintain the reactive charge in sufficient actuating contact with the bridgewire 55.

In one embodiment of this invention, the reactive charge includes a pyrotechnic material contained within the charge chamber 42. The pyrotechnic material is actuated by the reaction of the reactive charge, and not directly by the electrical current from the conductive pins 50 and 52, to produce a gas. Pyrotechnic materials for use in the practice of the invention can suitably take various forms including wafer, pellet and grain forms, for example. Preferred pyrotechnic materials for use in the practice of the invention can desirably include or contain a combustible fuel and oxidizer combination. In one preferred embodiment of the invention, the fuel is preferably composed of an organic compound that is rich in nitrogen and oxygen content as such fuel materials can desirably reduce the amount of oxidizer required for combustion thereof. Specific examples of materials useful as such fuels include but are not limited to: guanidine nitrate, aminoguanidine nitrate, diaminoguanidine nitrate, triaminoguanidine nitrate, nitroguanidine, and nitrotriazalone; tetrazoles, bitetrazoles, and triazoles, and combinations thereof. In addition, transition metal nitrate, chlorate, or perchlorate complexes of organic compounds may be used as fuels. Specific examples of preferred oxidizer component materials for use in the practice of the invention include but are not limited to one or more of the following materials: ammonium nitrate, ammonium perchlorate, transition metal amine nitrates, chlorates, and perchlorates; alkaline earth metal peroxides, nitrates, perchlorates, and chlorates; transition metal peroxides, nitrates, and perchlorates and alkali metal nitrates, chlorates, and perchlorates. In one embodiment of this invention, the reactive charge includes zirconium and potassium perchlorate (ZPP) and the pyrotechnic material is composed of titanium hydride potassium perchlorate (THPP).

A permeable fill material 60 is disposed within the passage 26. The permeable fill material 60 desirably unifies and joins the squib 30 with the end closure 20 to form the one-piece initiator device 10. As shown in FIG. 1, the permeable fill material 60 is disposed between the inner wall 28 and at least a portion of the squib 30 to secure the squib 30 within the passage 26 and maintain a suitable distance between the squib 30 and the end closure 20. Preferably, the permeable fill material 60 is made of an electrically non-conductive material to insulate and/or isolate the squib 30 from electrical contact with the end closure 20.

The permeable fill material 60 can be disposed within the passage 26 using any suitable method or process. In one preferred embodiment of the invention, the permeable fill material 60 can be applied or molded within the passage 26 using a suitable injection molding process in which a liquid or flowable material is disposed within the end closure passage 26 and about at least a portion of the squib 30. When the injection molded permeable fill material solidifies, the squib 30 is fixedly held or secured to the permeable fill material 60 and the permeable fill material 60 is fixedly held or secured to the end closure 20. Alternatively, the permeable fill material 60 may include at least two molded, and preferably mateable or interconnecting, portions that are positioned within the passage 26 to secure the squib 30 within the end closure 20. The molded portions can then be subsequently permanently bonded or secured together using a suitable melt-bonding process, such as a radio frequency (RF) welding or an ultrasonic welding process. As used herein, melt-bonding generally refers to methods of unifying or integrating portions together, for example to secure the squib 30 to the end closure 20 by melting and subsequently cooling the pieces or components, such as to form the permeable fill material 60.

Those skilled in the art and guided by the teachings herein provided will appreciate that the permeable fill material 60 can be formed from a variety of materials including various thermoplastic or similar compositions such as known in the art and such as are conducive to processing via injection molding and such as are well-suited for providing electrical insulation. In general, properties or conditions important in the selection of an appropriate material for use in such an application include: permeability or porosity, tensile and impact strength, electrical insulating properties or characteristics. The permeable fill material 60 can include any suitable material including, but not limited to, porous materials such as pumice and suitable materials known for porosity and/or permeability, including meltable materials for use in injection molding processes, admixtures, and any suitable open cell material, such as polyethylene, polyimide, microcellular urethanes, and polyesters. A presently preferred material includes a polyurethane material and variants thereof. In one preferred embodiment of the invention, the permeable fill material 60 may be composed of a normally impermeable material processed to produce voids and/or bubbles within the injected material to form a permeable fill material. Any suitable material or combination of materials can be used to produce the permeable fill material 60, which secures the squib 30 within the end closure passage 26 and forms or provides a controlled gas flow path 62 through the initiator device 10, as shown for example in FIG. 2.

In one preferred embodiment of the invention, the permeable fill material 60 forms a mating interface 70 at the end closure second end portion 24. Preferably, the mating interface 70 contains at least a portion of the conductive pins 50 and 52, as shown in FIG. 1. The mating interface 70 allows connection of the one-piece initiator device 10 to an associated electrical connector (not shown). The mating interface 70 can be adapted to match various configurations of electrical connectors by desirable shaping of an interface portion 72. For example, the interface portion 72 of the one-piece initiator device 10 shown in FIG. 1 covers an area of inside surface 74 at the second end 24 and defines the mating interface 70 that is shaped to correspond to a matched electrical connector (not shown). The interface portion 72 can be formed to include retaining shoulders 76 that hold the electrical connector securely in and to the mating interface 70.

Referring further to FIG. 1, in one preferred embodiment of the invention, an inflator 100 can be assembled or formed by connecting the one-piece initiator device 10 to a gas storage vessel 110. The inflator 100 is particularly suitable for use in vehicle inflation restraint systems. The gas storage vessel 110 is preferably attached or connected to the end closure 20 using any suitable attachment or connection means, such as welding or crimping the gas storage vessel 110 to the end closure 20. As shown in FIG. 1, the one-piece initiator device 10 is attached to the gas storage vessel 110 such that the canister 40 extends into an inflation gas storage chamber 112 formed by the gas storage vessel 110. The gas storage vessel 110 in combination with a cap 120 encloses the inflation gas storage chamber 112 for containing a supply of an inflation gas 124. Normally, the cap 120 prevents contact between the supply of the inflation gas 124 and the permeable fill material 60. The cap 120 is joined to the end closure 20 at the first end portion 22 and covers the canister 40. Due to construction constraints and necessary tolerances due to construction materials, a space or gap 130 is typically formed between the canister 40 and the cap 120.

The gas storage vessel 110 can include a fill port 131, such as is known in the art, wherethrough materials, such as inflation gas, can be passed into the gas storage chamber 112. After the gas storage chamber 112 has been filled, the fill port 131 can be appropriately blocked or plugged, as is known, such as by a pin or ball 132. As will be appreciated, such a fill port, if included in the inflator, can alternatively be placed or positioned in the gas storage vessel 110 as may be desired and understood by those skilled in the art. Inflation gas for use in the inflator of this invention can include materials known in the art, and desirably includes inert materials such as one or more noble gases such as argon and helium, for example, as well as materials such as nitrogen and carbon dioxide which are essentially inert under such processing conditions, nitrous oxide or various combinations thereof.

The general operation of an inflator of this invention can be described in reference to FIG. 1. Upon sensing a condition calling for inflation of an airbag, a sensor (not shown) will send a signal, e.g., an electric current, through the electrical connectors 50 and 52, which actuates the reactive charge 44. The reaction products resulting from the exothermic reaction of the actuated reactive charge 44 rupture the canister 40 preferably at the closed end portion 45 and subsequently the cap 120. The reaction products of the actuated reactive charge 44 include at least heat, and preferably include gas as well. The heat from the reacting reactive charge 44 actuates a gas generant material 46, thereby resulting in the production of gas. The force resulting from the exothermic reaction of reactive charge 44, as well as the increase in temperature and pressure inside the charge chamber 42, first ruptures the canister 40, then ruptures the cap 120. Subsequently, a rupturable gas outlet membrane or burst disc (not shown) ruptures and causes the pressurized inflation gas stored in the gas storage chamber 112 to immediately flow out of the gas storage chamber 112 through at least one gas exit opening operatively connected to an airbag cushion of the inflation restraint system.

Figure 2:
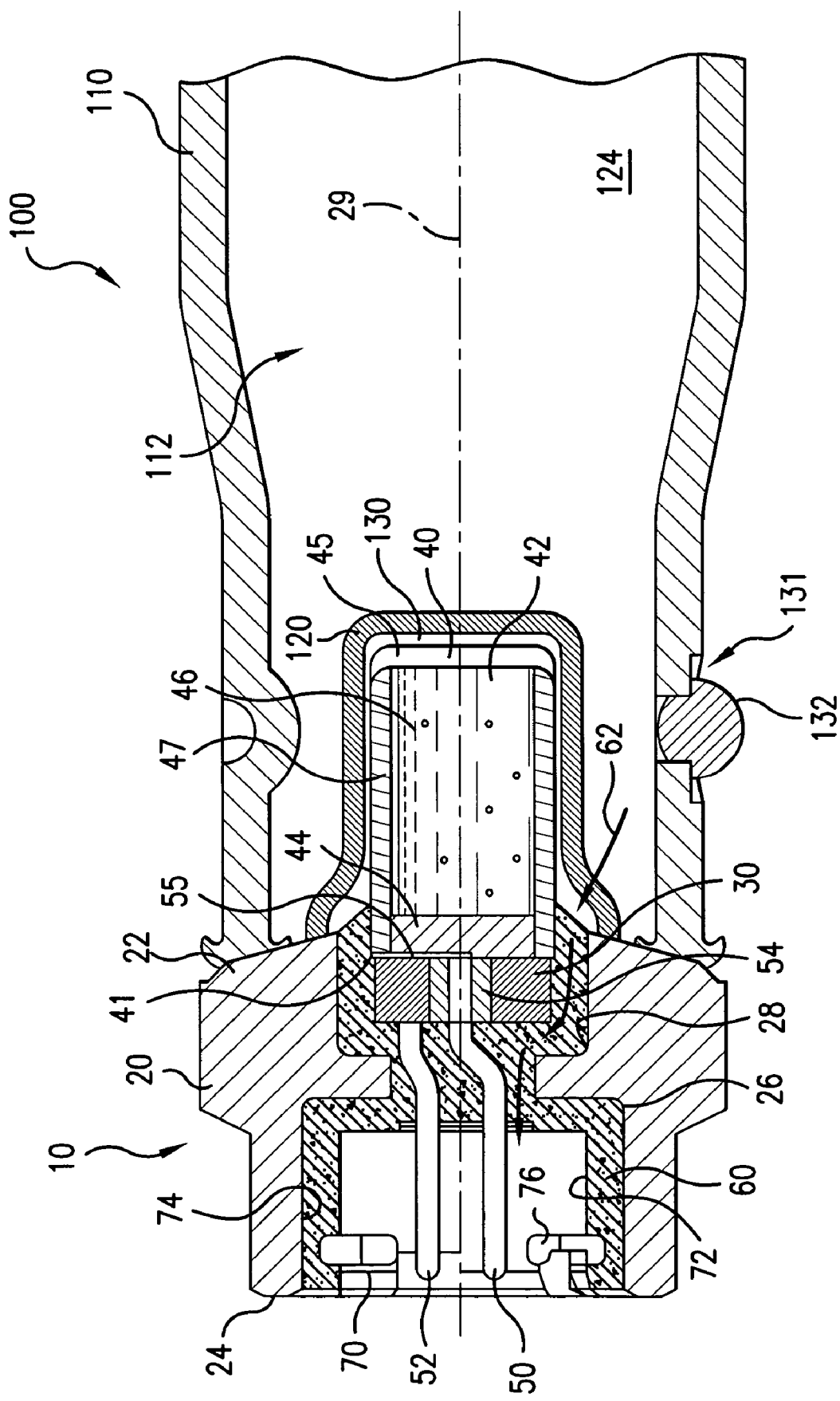
FIG. 2 shows a partial sectional view of the inflator of FIG. 1 having a defect or crack in a cap connected to the initiator device, and showing a supply of inflation gas controllably exiting the inflator along a controlled gas flow path through the initiator device in accordance with one preferred embodiment of the invention.

Referring to FIG. 2, in the event that the cap 120 proves defective, e.g., has a crack or void formed through a thickness of the cap 120, at least a portion of the supply of inflation gas 124 is allowed to leak from within the gas storage vessel 110, and into the space 130 between the cap 120 and the initiator canister 40. In conventional initiator devices including an impermeable fill material securing the squib within the end closure passage, the gas leaked from the gas storage vessel accumulates within the space 130 and is undetectable from an exterior of the inflator 100. Thus, it may be difficult to detect a gas leak during normal preinstallation testing procedures.

However, in the inflator 100 of the present invention, preinstallation inspection of the inflator is made easier by the presence of the permeable fill material 60. In the event that of a gas leak, e.g., the cap 120 has a crack or void, at least a portion of the supply of inflation gas 124 is allowed to detectably leak controllably from the gas storage vessel 110 through the permeable fill material 60 without accumulation of leaked gas within the space 130. During preinstallation testing procedures, the gas leakage is detectable as the leaked gas exits the initiator device 10 through the controlled gas flow path 62 provide by the permeable fill material 60, as shown in FIG. 2. The defective or nonfunctional inflator can be repaired or discarded before being installed permanently within a vehicle inflation restraint system, whereby increasing vehicle inflation restraint system reliability.

Thus, the invention provides a one-piece initiator device which can be attached to a gas storage vessel to form an inflator. The simplified one-piece construction of the initiator device of this invention provides the function of multicomponent initiator assemblies such as are known in the art for use with inflators. The one-piece initiator device of this invention also requires fewer production steps and materials to provide an initiator assembly to perform such desired functions. The one-piece initiator device of this invention can be attached to a gas storage vessel such as may have various sizes and shapes to provide multiple configurations of inflators for various designed inflatable restraint installations using a single initiator device design. In addition, the one-piece initiator device of this invention includes a permeable fill material providing a controlled gas flow path through the initiator device for detecting gas leakage from the gas storage chamber of the inflator.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A one-piece initiator device comprising:
   an end closure having a first end portion, a second end portion opposite the first end portion, and forming a passage between the first end portion and the second end portion;
   a squib at least partially positioned within the passage;

a canister mounted to the squib and extending outwardly from the end closure first end portion, the canister defining a charge chamber having a reactive charge disposed within the charge chamber; and a permeable fill material disposed within the passage and joining the squib to the end closure to form the one-piece initiator device, the permeable fill material insulating the squib from electrical contact with the end closure and providing a controlled gas flow path through the initiator device.

2. The one-piece initiator device of claim 1 further comprising at least one conductive pin connected to the squib and in actuating communication with the reactive charge.

3. The one-piece initiator device of claim 1 further comprising a mating interface at the end closure second end portion, the mating interface containing at least a portion of the conductive pin.

4. The one-piece initiator device of claim 3 wherein the permeable fill material adapts the mating interface to match an electrical connector.

5. The one-piece initiator device of claim 1 wherein the squib is secured within the passage and coaxially positioned with the end closure along a longitudinal axis of the end closure.

6. The one-piece initiator device of claim 1 wherein the permeable fill material is at least one material selected from the group consisting of a porous material, a meltable material, an open cell material, a polyurethane material and admixtures thereof.

7. The one-piece initiator device of claim 1 wherein the permeable fill material is secured within the end closure passage using one of an injection molding, a radio frequency welding, an ultrasonic welding, and a melt-bonding process.

8. An inflator comprising:
the one-piece initiator device of claim 1;
a cap joined to the end closure first end portion and covering the canister; and
a gas storage vessel attached to the end closure, the gas storage vessel in combination with the cap encloses an inflation gas storage chamber including a supply of an inflation gas, wherein the cap normally prevents contact between the supply of the inflation gas and the permeable fill material.

9. A one-piece initiator device comprising:
an end closure having a first end portion, a second end portion opposite the first end portion, and forming a passage between the first end portion and the second end portion;
a squib at least partially positioned within the end closure passage and joined to the end closure;
a canister mounted to the squib and extending outwardly from within the end closure passage, the canister defining a charge chamber;
a reactive charge disposed within the charge chamber;
a conductive pin positioned within an eyelet formed by the squib, the conductive pin in actuating communication with the reactive charge; and
a permeable fill material surrounding at least a portion of the squib and joining the squib to an inner wall of the end closure to form the one-piece initiator device, the permeable fill material insulating the squib from electrical contact with the end closure and providing a controlled gas flow path through the initiator device.

10. The one-piece initiator device of claim 9 further comprising a mating interface at the end closure second end portion, the mating interface containing at least a portion of the conductive pin, wherein the permeable fill material adapts the mating interface to mateably engage an electrical connector.

11. The one-piece initiator device of claim 9 wherein the permeable fill material is at least one material selected from the group consisting of a polyethylene, polyimide, microcellular urethane, polyester and polyurethane material.

12. The one-piece initiator device of claim 9 wherein the permeable fill material is secured within the end closure passage using one of an injection molding, a radio frequency welding, an ultrasonic welding, and a melt-bonding process.

13. An inflator comprising:
the one-piece initiator device of claim 9;
a cap joined to the end closure first end portion, the cap covering the canister; and
a gas storage vessel attached to the end closure, wherein the gas storage vessel in combination with the cap encloses an inflation gas storage chamber including a supply of an inflation gas.

14. The inflator of claim 13 wherein the cap normally prevents contact between the supply of the inflation gas and the permeable fill material.

15. An inflator comprising:
a one-piece initiator device comprising:
an end closure having a first end portion, a second end portion opposite the first end portion, and forming a passage between the first end portion and the second end portion;
a squib at least partially positioned within the passage;
a canister extending outwardly from the end closure first end portion and defining a charge chamber;
a reactive charge disposed within the charge chamber;
a conductive pin positioned within an eyelet formed by the squib, the conductive pin in actuating communication with the reactive charge; and
a permeable fill material disposed within the end closure passage and between an inner wall of the end closure and at least a portion of the squib, the permeable fill material joining the squib to the end closure to form the one-piece initiator device and insulating the squib from electrical contact with the end closure, the permeable fill material providing a controlled gas flow path through the initiator device;
a cap joined to the end closure first end portion and covering the canister; and
a gas storage vessel attached to the end closure, the gas storage vessel in combination with the cap forming a gas storage chamber containing a supply of an inflation gas, the cap normally preventing contact between the supply of the inflation gas and the permeable fill material.

* * * * *